United States Patent [19]

Troyer

[11] 4,299,373

[45] Nov. 10, 1981

[54] FLUID FLOW CONTROL VALVE

[75] Inventor: Terrence J. Troyer, Columbus, Ohio

[73] Assignee: Ranco Incorporated, Columbus, Ohio

[21] Appl. No.: 115,738

[22] Filed: Jan. 28, 1980

[51] Int. Cl.³ ............... F16K 31/126; F16K 1/226
[52] U.S. Cl. ............................. 251/58; 251/61.5; 251/279; 251/288; 251/306
[58] Field of Search ................ 74/526; 251/25, 61, 251/58, 61.5, 279, 284, 286, 298, 305, 306, 158, 160, 288; 261/39 B, 50 A, 39 A, 69 R

[56] References Cited

U.S. PATENT DOCUMENTS

| | | | |
|---|---|---|---|
| 1,220,729 | 3/1917 | Clark et al. | 251/279 |
| 2,372,273 | 3/1945 | Hermanson | 251/58 |
| 3,568,975 | 3/1971 | Obermaier et al. | 251/58 |
| 3,675,681 | 7/1972 | Obermaier | 251/305 |
| 3,709,461 | 1/1973 | Johnson | 251/58 |
| 3,796,408 | 3/1974 | Sheppard | 251/58 |
| 3,807,245 | 4/1974 | Sheppard | 251/58 X |
| 3,857,406 | 12/1974 | Dorling | 251/306 |
| 3,929,314 | 12/1975 | Stratynski | 251/58 |
| 4,073,465 | 2/1978 | Sheppard | 251/58 |
| 4,176,823 | 12/1979 | Gliatas | 251/58 |

Primary Examiner—Martin P. Schwadron
Assistant Examiner—G. L. Walton
Attorney, Agent, or Firm—Watts, Hoffmann, Fisher & Heinke Co.

[57] ABSTRACT

A flow control valve is disclosed comprising a valve housing defining a through flow passage, a valve member supported in the housing for pivotal movement with respect to the housing between an open position in which flow through the passage is enabled and a closed position wherein flow through the passage is blocked, and an actuator for moving the valve member between said position. A linkage transmits actuating force from the actuator to the valve member and, a force limiting device limits the actuating force transmitted to the valve member when the valve member is in its closed position.

3 Claims, 3 Drawing Figures

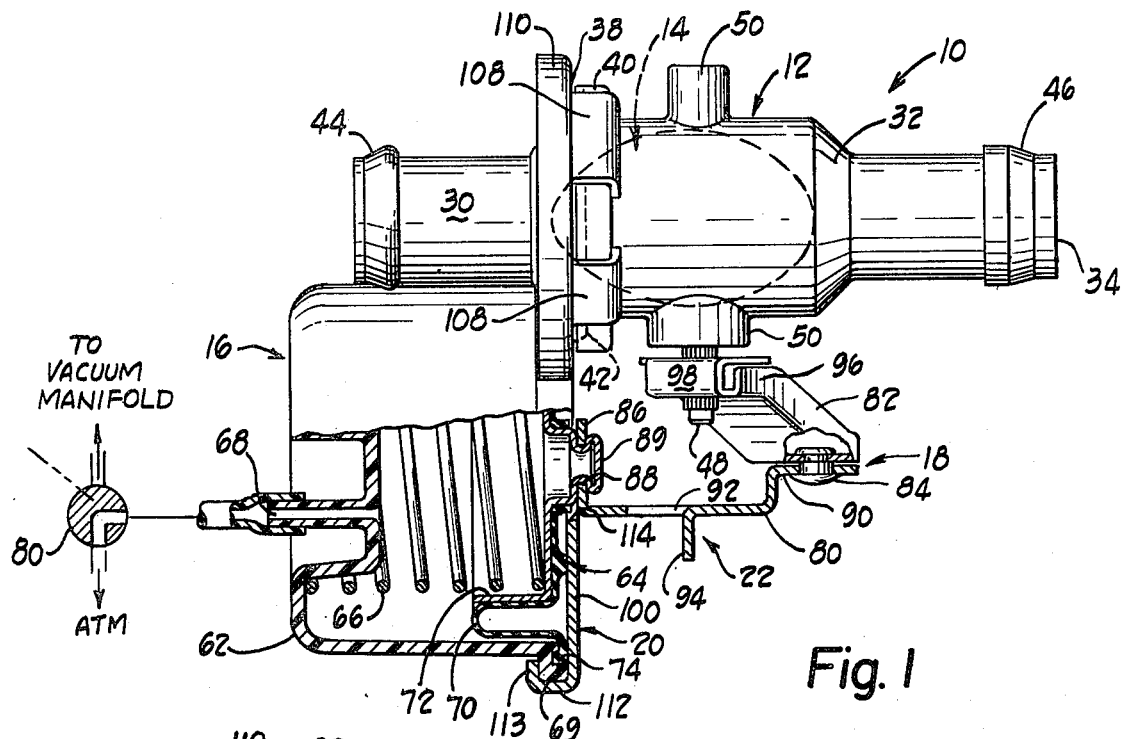
Fig. 1
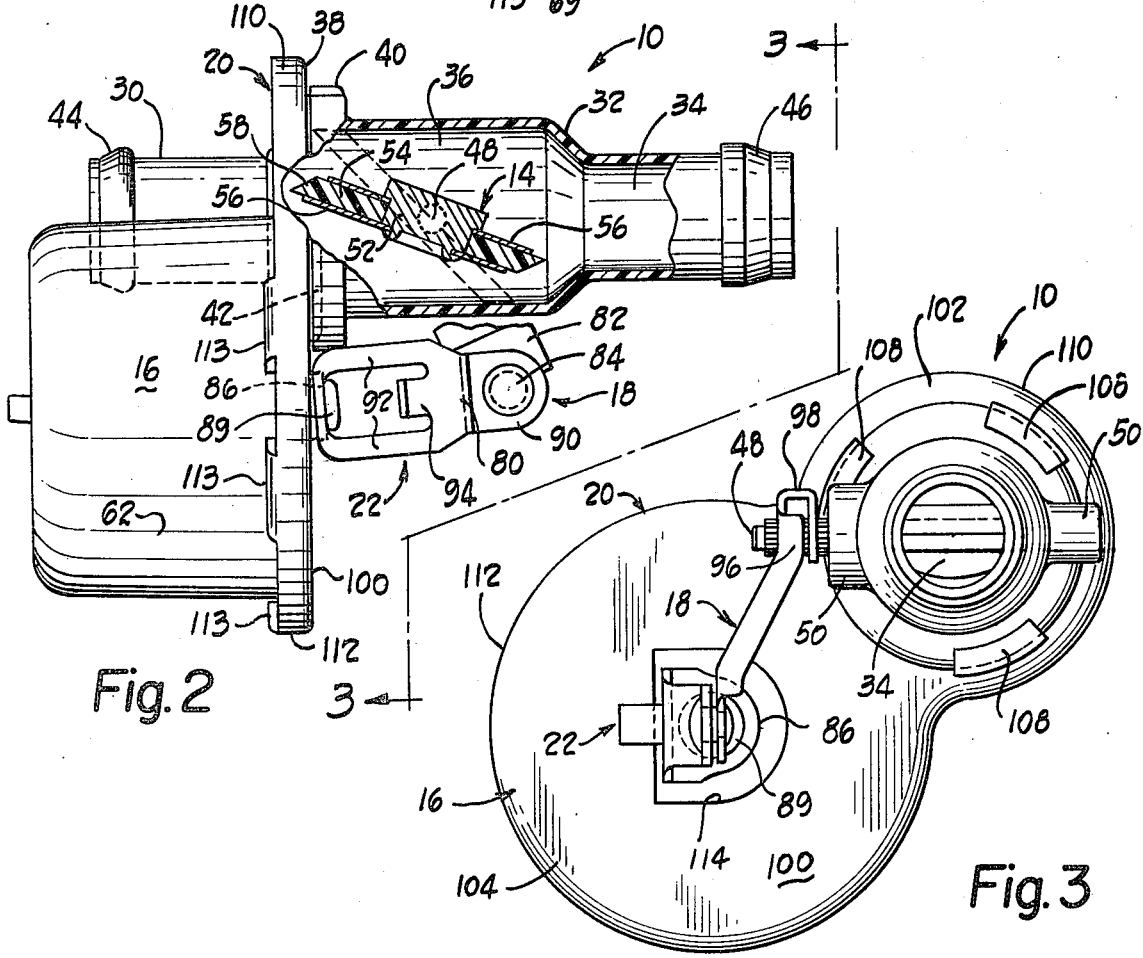
Fig. 2
Fig. 3

FLUID FLOW CONTROL VALVE

BACKGROUND OF THE INVENTION

1. Field of the Invention

The present invention relates to valves and more particularly relates to butterfly type valves operated between open and closed positions by actuators.

2. Prior Art

So-called butterfly type valves have long been used for controlling the flow of various kinds of fluids in many different applications. One relatively common area of usage of such valves is in automotive vehicles driven by liquid cooled internal combustion engines and in which butterfly valves have been used to govern the flow of engine coolant through heat exchangers known as "heater cores" which function to heat air circulated in the vehicle passenger compartments. In this and other generally similar applications it is essential that the butterfly valve function to effectively seal against passage of fluid when in its closed position. Accordingly, many prior art butterfly valve constructions have employed a butterfly valve member positioned in a valve housing defining through flow passage for the fluid with the butterfly valve having a resilient periphery sealingly engageable with the surrounding valve housing wall when the valve member is in its closed position.

In many applications the butterfly valves are opened and closed in response to a remotely sensed condition such as air and/or liquid temperature, and in such circumstances it is common to provide an actuator of some sort for shifting the valve member between open and closed positions in response to changes in the sensed condition. Examples of valves constructed in this general fashion are illustrated by U.S. Pat. Nos. 3,857,406; 3,568,975; 3,675,681; 2,544,520; and 4,176,823.

In the butterfly valve assemblies illustrated by the U.S. Patents referred to above, the butterfly valve is operated between its open and closed positions by a fluid pressure operated actuator. In the disclosures of these patents the actuator is operated by differential air pressure applied to a piston or diaphragm which is in turn connected to the butterfly valve by a force transmitting linkage. The piston or diaphragm is also acted upon by a spring which actuates the valve to its open position in the absence of a differential pressure force acting on the piston or diaphragm.

In automotive vehicle applications it is commonplace to utilize the vacuum pressure in the engine intake manifold as a source of operating pressure for valve actuators of the type referred to. When one side of the piston or diaphragm is communicated with the engine intake manifold while the opposite side is exposed to atmospheric air pressure, the resultant differential air pressure acting on the piston or diaphragm moves the piston or diaphragm against the force of the spring and shifts the valve member to its closed position. The degree of vacuum pressure present in the engine intake manifold thus determines the magnitude of the valve closing force. This vacuum pressure varies widely depending upon operating conditions of the engine. Thus it is necessary to design the actuator so that the valve can be tightly closed against fluid flow even when the engine intake manifold vacuum is quite small (i.e. close to atmospheric pressure). As a result, when engine manifold vacuum levels are high, the valve actuators are capable of exerting a substantial excess amount of closing force on the already closed valve.

Excessive valve closing forces have led to failures of otherwise well constructed, functional valves. When a valve is in its closed condition and the engine is operated under various load and speed conditions, the closed valve is, in effect, cranked by varying forces while in its closed position and when the valve member is formed with a resiliently deformable periphery for sealing purposes, the valve tends to become jammed in its closed position. The cyclical cranking forces also tend to cause spalling of the resilient valve members which results in the valve members eventually failing to seal against the valve housing when in their closed positions.

Moreover, many valves of the type referred to have to be constructed by positioning the butterfly valve member within a surrounding valve body and then fixing the valve member to its operating shaft. Fixing the valve member to its shaft in situ is sometimes accomplished by spot welding and sometimes by cold forming a driving connection between the shaft and valve. Examples of these assembly techniques are disclosed, respectively, by U.S. Pat. Nos. 3,568,975 and 4,176,823. These kinds of force transmitting connections between valve member and shaft are adequately strong to assure opening and closing of the valves but have not always had sufficient strength to resist excessive valve closing forces without breaking.

In many valves the driving connection between the actuator linkage and the valve member shaft is also a relatively light duty connection which can be rendered ineffective by the application of excessive valve closing forces. It has become a common practice, particularly in the automotive industry, to test the valves by applying closing forces substantially greater than those expected to be encountered during use to determine whether the valves jam or the driving connections fail. Such testing results in the failure of many valves which are otherwise readily capable of operating satisfactorily in the absence of excessive closing forces.

SUMMARY OF THE INVENTION

The present invention provides a new and improved flow control valve having a valve housing defining a fluid flow passage with a valve member supported by the housing for rotation between an open position wherein fluid flows through the passage and a closed position wherein the passage is blocked. An actuator moves the valve member between its positions with the actuating forces transmitted to the valve member via a linkage arrangement. A force limiting device prevents transmission of excessive actuating forces to the valve member when in its closed position.

In one preferred form of the invention a liquid flow controlling valve is provided which includes a tubular valve housing defining a fluid flow passageway, a valve member supported in the housing for pivotal movement between open and closed positions with the valve member sealingly engaging the valve housing when in a closed position and a valve actuator including an actuator housing and a movable actuator member. A structural support housing interconnects the actuator housing and the valve housing for preventing relative movement between them, and an actuating force transmitting linkage is disposed between the pressure actuated member and the valve member for moving the valve member between its positions. The force limiting device is formed by an abutment element associated with the linkage which is engageable with one of the housings to limit the force applied to the valve member when the valve member is in its closed position.

In a preferred and illustrated valve embodying the invention the abutment element projects from the linkage for engagement with the support housing so that the force applied to driving connections between the linkage and the valve member and its supporting shaft is limited.

Other features and advantages of the invention will become apparent from the following detailed description of a preferred embodiment made with reference to the accompanying drawings which form a part of the specification.

BRIEF DESCRIPTION OF THE DRAWINGS

FIG. 1 is an elevational view of a control valve embodying the present invention with portions broken away and shown in cross section;

FIG. 2 is a view seen approximately from the plane indicated by the line 2—2 of FIG. 1 with portions broken away and shown in cross section; and, FIG. 3 is a view seen approximately from the plane indicated by the line 3—3 of FIG. 2.

DESCRIPTION OF PREFERRED EMBODIMENTS

A flow control valve 10 embodying the present invention is illustrated in the drawings. The preferred and illustrated flow control valve 10 is constructed and arranged for controlling the flow of internal combustion engine coolant to a heater core (not illustrated) in an automotive vehicle. The valve 10 includes a valve housing 12 defining a through passageway for engine coolant, a valve member 14 disposed within the housing 12 for governing the flow of coolant through the passageway, an actuator 16 for operating the valve member between open and closed positions through the agency of a linkage 18, a support housing 20 for securing the actuator 16 and valve housing 12 in a predetermined fixed relationship with respect to each other, and a force limiting device 22 for preventing transmission of excessive closing forces to the valve member.

The valve housing 12 is constructed to be connected in the engine coolant system. The preferred housing 12 is formed by a pair of tubular housing members 30, 32 which are secured together to define the flow passage, which is indicated by the reference character 34. The housing member 32 defines an enlarged passage section 36 (FIG. 2) within which the valve member 14 is received and the housing members 30, 32 are secured together along confronting radially outwardly extending flanges 38, 40. The interface of the flanges is sealed by a sealing ring 42 interposed between them. The housing members 30, 32 define respective oppositely extending hose nipples 44, 46 shaped to sealingly receive the usual engine coolant hoses by which the engine coolant is directed through the valve housing. The housing members 30, 32 are illustrated as formed of molded plastic material but it should be appreciated that those members could alternatively be formed by die cast aluminum parts or from other suitable materials.

The valve member 14 is pivotally supported in the enlarged passage section 36 for movement between an open position and wherein engine coolant is permiteed to flow through the housing 12 and a closed position in which the engine coolant flow through the housing 12 is blocked. In the preferred and illustrated embodiment the valve member 14 is fixedly connected to a driving shaft 48 which extends through the passage section 36 and is supported by opposed bearing portions 50 formed integrally with the housing member 32. The valving member 14 is preferably of generally elliptical configuration (see FIG. 1) and, as best illustrated by FIG. 2, is formed by an assembly of a metal central support member 52 drivingly connected to the shaft 48, a resiliently deformable rubber-like valve body 54 carried on the member 52, and supporting plates 56 disposed along opposite faces of the valve body 54. The body 54 defines a resiliently deformable valve body periphery 58 which, when the valve member is in its closed position, sealingly engages the surrounding cylindrical wall of the housing member 32 so that coolant is prevented from flowing the housing 12 around the periphery of the valve member. The valve member is of the sort generally referred to as a "butterfly" valve and the preferred construction of the valve member is shown and described in detail in U.S. Pat. No. 4,176,823 the disclosure of which is incorporated herein by this reference to it.

Because the housing member 32 is tubular and continuous, the valve member 14 must be positioned within the body member 32 before it is assembled to its driving shaft 48. In the illustrated valve the shaft is formed with a splined central section which is press fit into an undersized hole in the central support member 52 so that the support member material is cold formed into a driving connection with the teeth of the shaft splines (see FIG. 2). Other forms of driving connection can be employed, such as spot welding, if desirable and convenient.

The actuator 16 moves the valve member 14 between its open and closed positions to control the flow of coolant through the valve housing. The preferred actuator is formed by an actuator housing 62, a pressure responsive actuator member 64 movable relative to the housing 62, and an actuating spring 66 which reacts between the housing 62 and the actuator member 64. The actuator housing 62 is preferably formed by a molded plastic cup having a port 68 projecting from its closed end and an enlarged lip 69 extending about its open end.

The actuator member 64 is formed by a disphragm 70 and a reinforcing cup 72 carried by the diaphragm. The actuator member is hermetically sealed in place across the open end of the housing 62 with the diaphragm 70 forming an external peripheral sealing lip 74 which is sealingly engaged with the housing cup lip 69. The diaphragm itself is formed by a thin flexible membrane of rubber-like material defining a central opening in which a central projecting part of the diaphragm reinforcing cup 72 is sealingly retained.

The actuating spring 66 is preferably a helical compression spring which is compressed between the closed end of the actuator housing cup 62 and the closed end of the diaphragm reinforcing cup 72. In the absence of differential pressure exerted upon the diaphragm 70, the spring 66 urges the actuator member 62 in a direction outwardly relative to the open end of the actuator housing cup, moving the valve member 14 to its open position. The spring 66 is preferably received in the diaphragm reinforcing cup 72 so that it does not act directly on the diaphragm.

The pressure within the chamber defined by the actuator housing 62 and the actuator member 64 is governed by a three-way control valve 80 which alternatively (a) a tubular valve housing defining a coolant flow passage extending therethrough;

(b) a butterfly valve member supported in said valve body for pivotal movement between an open position wherein coolant flows through said body and a closed position wherein coolant flow is blocked, said valve member defining a periphery sealingly engageable with the valve housing when in said closed position, said valve member and said valve body engaging resiliently when said valve member is in the closed position;

(c) a valve actuator comprising an actuator housing and a fluid pressure actuated member supported for movement in said actuator housing;

(d) a structural support housing interconnecting said actuator housing and said valve housing for preventing relative movement therebetween;

(e) an actuating force transmitting linkage connected between said pressure actuated member and said valve member for moving said valve member between said positions; and, (f) a force limiting means comprising an abutment element carried by said linkage and engageable with one of said housings to limit the force applied to said valve member from said actuator when said valve member is in said closed position, said abutment element located on said linkage relative to said one housing for engaging said one housing after said valve member and said valve housing are resiliently engaged to limit the resilient engagement to a predetermined degree.

2. The valve claimed in claim 1 wherein said abutment element is formed integrally with said linkage and projects thereform, said abutment element including a projecting portion engageable with said one of said housings.

3. The valve claimed in claim 1 wherein said linkage comprises a shaft-like member drivingly connected to said valve member, a crank member drivingly connected to said shaft-like member and a link member extending between said fluid pressure actuated member and said crank member, said abutment element carried by said link member so that the force transmitted by the driving connections is limited by engagement of said abutment element and said one housing.

* * * * *